(12) United States Patent
Mildner et al.

(10) Patent No.: US 9,539,922 B2
(45) Date of Patent: Jan. 10, 2017

(54) VEHICLE SEAT FOR A VEHICLE AND VEHICLE FLEET WITH THE VEHICLE SEAT

(71) Applicant: GM GLOBAL TECHNOLOGY OPERATIONS LLC, Detroit, MI (US)

(72) Inventors: Udo Mildner, Limburg (DE); Lothar Teske, Aschaffenburg (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/816,577

(22) Filed: Aug. 3, 2015

(65) Prior Publication Data
US 2016/0031346 A1 Feb. 4, 2016

(30) Foreign Application Priority Data

Aug. 2, 2014 (DE) .................. 10 2014 011 563

(51) Int. Cl.
*B60N 2/48* (2006.01)
*B60N 2/68* (2006.01)

(52) U.S. Cl.
CPC .......... *B60N 2/4805* (2013.01); *B60N 2/4808* (2013.01); *B60N 2/4867* (2013.01); *B60N 2/68* (2013.01); *B60N 2002/4897* (2013.01)

(58) Field of Classification Search
CPC ....... B60N 2/4805; B60N 2/4808; B60N 2/48; B60N 2/4897; B60N 2/4867; B60N 2002/4897
USPC .............. 296/65.01; 297/406, 407, 391, 410, 297/216.12
See application file for complete search history.

(56) References Cited

U.S. PATENT DOCUMENTS

| 4,875,736 | A | 10/1989 | Brambilla |
|---|---|---|---|
| 6,022,078 | A * | 2/2000 | Chang ................ B60N 2/4817 297/391 |
| 7,114,780 | B1 * | 10/2006 | Lee ..................... B60N 2/4802 297/217.4 |
| 7,946,653 | B2 * | 5/2011 | Robert ................ B60N 2/4814 297/408 |
| 8,066,329 | B2 * | 11/2011 | Liu ..................... B60N 2/4876 297/217.3 |
| 8,979,205 | B2 | 3/2015 | Zimmermann et al. |
| 2004/0113481 | A1 | 6/2004 | Saberan et al. |

(Continued)

FOREIGN PATENT DOCUMENTS

| DE | 202005001773 U1 | 6/2006 |
|---|---|---|
| DE | 102007052960 A1 | 5/2009 |
| DE | 1020080033479 A1 | 1/2010 |

OTHER PUBLICATIONS

German Patent Office, German Search Report for German Application No. 10 2014 011 563.1, dated Jan. 29, 2015.

*Primary Examiner* — Gregory Blankenship
(74) *Attorney, Agent, or Firm* — Lorenz & Kopf LLP (57) ABSTRACT

A vehicle seat is disclosed as having a seat structure with an upper transverse strut for receiving a headrest of the vehicle seat. The headrest has right and left headrest rods for coupling with the upper transverse strut. The transverse strut 6 includes right and left receiving openings for the right and left headrest rods. The headrest may be arranged with the headrest rods in various guide channels to define first and second mounting positions relative to the upper transverse strut. The headrest in the first mounting position is offset transversely to the seat direction with respect to the headrest in the second mounting position.

17 Claims, 11 Drawing Sheets

(56) References Cited

U.S. PATENT DOCUMENTS

| | | | | |
|---|---|---|---|---|
| 2011/0210594 A1* | 9/2011 | Eisenbraun | ........... | B60N 2/4808 |
| | | | | 297/391 |
| 2012/0086255 A1* | 4/2012 | Ishimoto | .............. | B60N 2/4228 |
| | | | | 297/406 |
| 2013/0082504 A1 | 4/2013 | Archambault | | |
| 2013/0134753 A1* | 5/2013 | Buehlmeyer | ............ | B60N 2/38 |
| | | | | 297/284.1 |
| 2013/0257117 A1* | 10/2013 | Seki | ..................... | B60N 2/4228 |
| | | | | 297/216.1 |
| 2014/0028072 A1* | 1/2014 | Ronzi | ................. | B60N 2/4811 |
| | | | | 297/410 |
| 2015/0329021 A1* | 11/2015 | Aquillue | .............. | B60N 2/4808 |
| | | | | 297/391 |
| 2015/0329023 A1* | 11/2015 | Ishihara | ............... | B60N 2/4861 |
| | | | | 297/406 |
| 2016/0031346 A1* | 2/2016 | Mildner | ............... | B60N 2/4805 |
| | | | | 296/64 |

* cited by examiner

VEHICLE SEAT FOR A VEHICLE AND VEHICLE FLEET WITH THE VEHICLE SEAT

CROSS-REFERENCE TO RELATED APPLICATION

This application claims priority to German Patent Application No. 102014011563.1, filed Aug. 2, 2014, which is incorporated herein by reference in its entirety.

TECHNICAL FIELD

The present disclosure pertains to a vehicle seat, and more particularly to a seat having a headrest configured to be positioned in at least a first and second mounting position and to a vehicle fleet having such a vehicle seat.

BACKGROUND

In almost every vehicle, seats are integrated for occupants of the vehicle. Attempts are known to configure a vehicle seat so that it can be installed in different vehicles. For example, DE 10 2007 052 960 A1 describes a seat assembly structure of a backrest- or seat frame of a vehicle seat. The seat assembly structure includes a metal structure which has a plurality of longitudinal and transverse elements connected with one another. At least one of the longitudinal elements and/or at least one of the transverse elements are produced from a profile semi-finished product by cutting to a predetermined length and, if applicable, by bending. Through the presetting of the length of the transverse elements, a designer can preset the width of the vehicle seat in a simple manner and therefore adapt it for different vehicle models, without accepting high costs for investment in forming tools for this.

In addition, other objects, desirable features and characteristics will become apparent from the subsequent summary and detailed description, and the appended claims, taken in conjunction with the accompanying drawings and this background.

SUMMARY

The present disclosure is based on the problem of providing a functional vehicle seat which is able to be used flexibly and is able to be produced conveniently. In particular, a vehicle seat for a vehicle, for example for an automobile or truck is proposed. The vehicle seat can optionally be constructed as a driver's or passenger's seat or as a rear seat of the vehicle in a bench seat configuration. The vehicle seat includes a seat structure which has an upper transverse strut, which preferably forms an upper termination of a backrest of the vehicle seat. The upper transverse strut is constructed to receive a headrest of the vehicle seat. Preferably, the seat structure also includes left and right side struts of the backrest, laterally spaced from the center of the seat structure, a seat pan for sitting thereon, and left and right side struts of the seat for connecting the seat structure with a seat rail on the vehicle floor.

The vehicle seat has a headrest, which includes a right headrest rod and a left headrest rod. The right and left headrest rods are constructed for fastening the headrest on the upper transverse strut of the seat structure. The headrest is preferably fastened by inserting the headrest rods in the upper transverse strut. Preferably, the right and left headrest strut are identical in construction. The transverse strut has a right receiving opening of a right guide channel for the right headrest rod. The transverse strut has a left receiving opening of a left guide channel for the left headrest rod. For example, the headrest rods are able to be inserted through the receiving openings and along the guide channels into the upper transverse strut. Preferably, the right and left receiving opening are arranged on a horizontal upper side of the transverse strut. The headrest is arranged with the right headrest rod in the right guide channel and with the left headrest rod in the left guide channel. Here, it is fastened optionally in a first mounting position or in a second mounting position on the upper transverse strut.

The headrest in the first mounting position is arranged with respect to the headrest in the second mounting position offset transversely to the seat direction. Preferably, the headrest is able to be remounted and/or adjusted transversely to the seat direction from the first into the second mounting position. In particular, the headrest is able to be transferred manually and/or in a tool-free manner from the first into the second mounting position by predetermined inserting and/or positioning of the headrest rods into the receiving openings.

It is advantageous that the vehicle seat, owing to the possibility of the offset arrangement of the headrest transversely to the seat direction, can be mounted a distance further to the left or to the right on the upper transverse strut. Through the possibility of the selection and/or displacement between the first and second mounting position, the vehicle seat is able to be used flexibly for at least two different vehicles. The different vehicles are preferably a vehicle of different segments. In particular, the different vehicles are constructed as a vehicle of a first segment, e.g. B-segment such as a small or compact car, and as a vehicle of a second segment, e.g. C-segment such as a medium-class car. Further vehicles of further segments are also possible within the scope of the present disclosure. Through the fact that the vehicle seat is able to be installed in the different vehicles, the number of components for different vehicle seats can be reduced in an advantageous manner and costs can be saved. Furthermore, development expenditure for different vehicle seats is reduced. A further advantage is that the same body floor structures can be used in the different vehicles and thereby likewise costs can be saved.

In a preferred embodiment of the present disclosure, the first mounting position of the headrest is associated with a first seat track of the vehicle seat for the first segment vehicle. The second mounting position is preferably associated with a second seat track of the vehicle seat for the second segment vehicle. In particular, the headrest is mounted in the first mounting position when the vehicle seat is arranged in the first seat track of the first segment vehicle. Optionally, the headrest is mounted in the second mounting position when the vehicle seat is arranged in the second seat track of the second segment vehicle. For example, the seat track of the vehicle seat is defined as the position of the center of the seat, e.g. as the position of the center of the seat pan in the seat direction, in the vehicle.

A preferred implementation of the present disclosure makes provision that the right and left receiving opening are arranged and/or constructed mirror-symmetrically to an averaged seat track from the first and second seat track. In particular, the averaged seat track results from a half of the distance between the first and second seat track.

In a preferred embodiment, the right and left receiving opening are constructed as elongated holes. Preferably, each of the elongated holes has a left and a right positioning cutout. In particular, the left and right positioning cutout are constructed for the positioning of a guide bush for the first and second headrest rod. In particular, by selection of the left or of the right positioning cutout, the first or second mounting position is able to be set. Thereby, the headrest rods can be positioned in a simple manner and mounted in the correct mounting position.

In a possible implementation of the present disclosure, the upper transverse strut has on its horizontal underside a right locking device and a left locking device. Preferably, the right locking device for locking the right headrest rod is constructed in the upper transverse strut and the left locking device for locking the left headrest rod is constructed in the upper transverse strut. Thereby, the headrest is able to be and/or is connected securely with the seat structure. For example, the right and left locking device are constructed as keyhole openings. Preferably, the right guide channel opens into the right locking device and the left guide channel opens into the left locking device.

It is particularly preferred that the seat structure has the right guide bush or bushing for the right headrest rod and the left guide bush or bushing for the left headrest rod. Preferably the right and left guide bush are identical in construction. For example, the right guide bush is inserted and/or introduced into the right guide channel and the left guide bush into the left guide channel. The headrest rods can then be inserted into the guide bushes and positioned via these in the upper transverse strut and locked. In particular, the right guide bush positions the right headrest rod in the right receiving opening and guides the latter along the right guide channel. Optionally additionally, the right guide bush locks the right headrest rod in the right locking device. Preferably, the left guide bush positions the left headrest rod in the left receiving opening and guides the latter along the left guide channel. Optionally additionally, the left guide bush locks the left headrest rod in the left locking device.

It is particularly preferred that each of the two guide bushes has at an upper end a radially projecting flange, which is constructed for covering the right or respectively left receiving opening of the upper transverse beam. Preferably, the flange has a positioning pin, which engages optionally, in particular depending on the first or second mounting position, into the right or into the left positioning cutout of the right or respectively left receiving opening. In particular, the headrest is mounted in the first mounting position when the positioning pin engages into the right positioning cutout. Optionally, the headrest is mounted in the second mounting position, when the positioning pin engages into the left positioning cutout. For example, the positioning of the flange and of the positioning pin in the left or right positioning cutout can take place by rotation of the guide bush about its longitudinal axis. This is particularly advantageous, because the rotation can be carried out in a simple manner, in particular free of tools. Thereby, costs and work time can be saved.

In a preferred implementation of the present disclosure, each of the two guide bushes for the headrest rods has at a lower end at least one, preferably two or more, radially circumferentially arranged spring devices. For example, the spring devices are constructed as leaf springs. In particular, the spring devices are constructed to engage into the right or respectively left locking device, to brace and/or lock it therein and to thereby lock the headrest rods in the upper transverse strut. Through the fact that preferably two or more spring devices are provided, the headrest rods can be securely locked independently of the rotation, positioning and/or mounting position.

A further subject of the present disclosure concerns a vehicle fleet with the first segment vehicle and with the second segment vehicle. Preferably the first segment vehicle differs in configuration and size from the second segment vehicle. The first segment vehicle is constructed e.g. as a B-segment vehicle such as a small or compact car. The second segment vehicle is constructed e.g. as a C-segment vehicle such as a medium-class car. Also other and/or further segment vehicles are possible within the scope of the present disclosure. In particular, the vehicle seat is integrated in the first segment vehicle, wherein a second identically constructed vehicle seat is installed in the second segment vehicle. This is of great advantage, because the same vehicle seat can be used for at least two different vehicles and thereby the number of components and the development expenditure for the vehicle seat can be distinctly reduced.

Preferably, the vehicle seats differ through the selected mounting position of the headrest, when they are installed into the different vehicles. Particularly preferably, the right headrest rod is arranged in the right guide channel and the left headrest rod is arranged in the left guide channel, wherein the right and left headrest rod are arranged here mirror symmetrically to the first seat track. This is the case in particular when the vehicle seat is arranged in the first segment vehicle. In particular, the headrest then takes up the first mounting position.

In a preferred embodiment of the present disclosure, the flange of the right and left guide bush projects radially towards the right therefrom. Preferably, the positioning pin of the right and left guide bush engages into the right positioning cutout of the right or respectively left receiving opening. This is the case in particular when the vehicle seat is arranged in the first segment vehicle. In particular, the headrest is situated in the first mounting position which is provided for the first segment vehicle.

To arrange the vehicle seat in the second segment vehicle, the right headrest rod is preferably arranged in the right guide channel and the left headrest rod is preferably arranged in the left guide channel, wherein the right and left headrest rod are arranged mirror-symmetrically to the second seat track. This is the case in particular when the vehicle seat is arranged in the second segment vehicle. In particular, in this case the headrest is situated in the second mounting position.

In the second mounting position of the headrest, the flange of the right and left guide bush preferably projects radially to the left therefrom. In particular, the positioning pins engage into the respective left positioning cutout of the right or respectively left receiving opening. In this case, the headrest is situated in the second mounting position, which is provided for the second segment vehicle.

In a preferred embodiment of the present disclosure, the vehicle seat has a first seat upholstery. Preferably, the first seat upholstery is arranged and/or constructed mirror-symmetrically to the first seat track, when the vehicle seat is arranged in the first segment vehicle. For example, the first seat upholstery is formed and/or foamed according to the first seat track, in particular is aligned thereto and/or adapted thereto.

In a possible implementation of the present disclosure, the vehicle seat has a second seat upholstery. Preferably, the second seat upholstery differs from the first seat upholstery in form and/or shape. Preferably, the second seat upholstery is arranged and/or constructed mirror-symmetrically to the second seat track, when the vehicle seat is arranged in the second segment vehicle. For example, the second seat upholstery is formed and/or foamed according to the second seat track, in particular is aligned thereto and/or adapted thereto. It is advantageous that two different seat upholsteries are able to be applied onto one and the same seat structure and thereby are able to be optionally mounted into the first segment vehicle or into the second segment vehicle.

BRIEF DESCRIPTION OF THE DRAWINGS

The present disclosure will hereinafter be described in conjunction with the following drawing figures, wherein like numerals denote like elements.

Parts which correspond to one another or which are identical are given the same reference numbers respectively in the figures.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
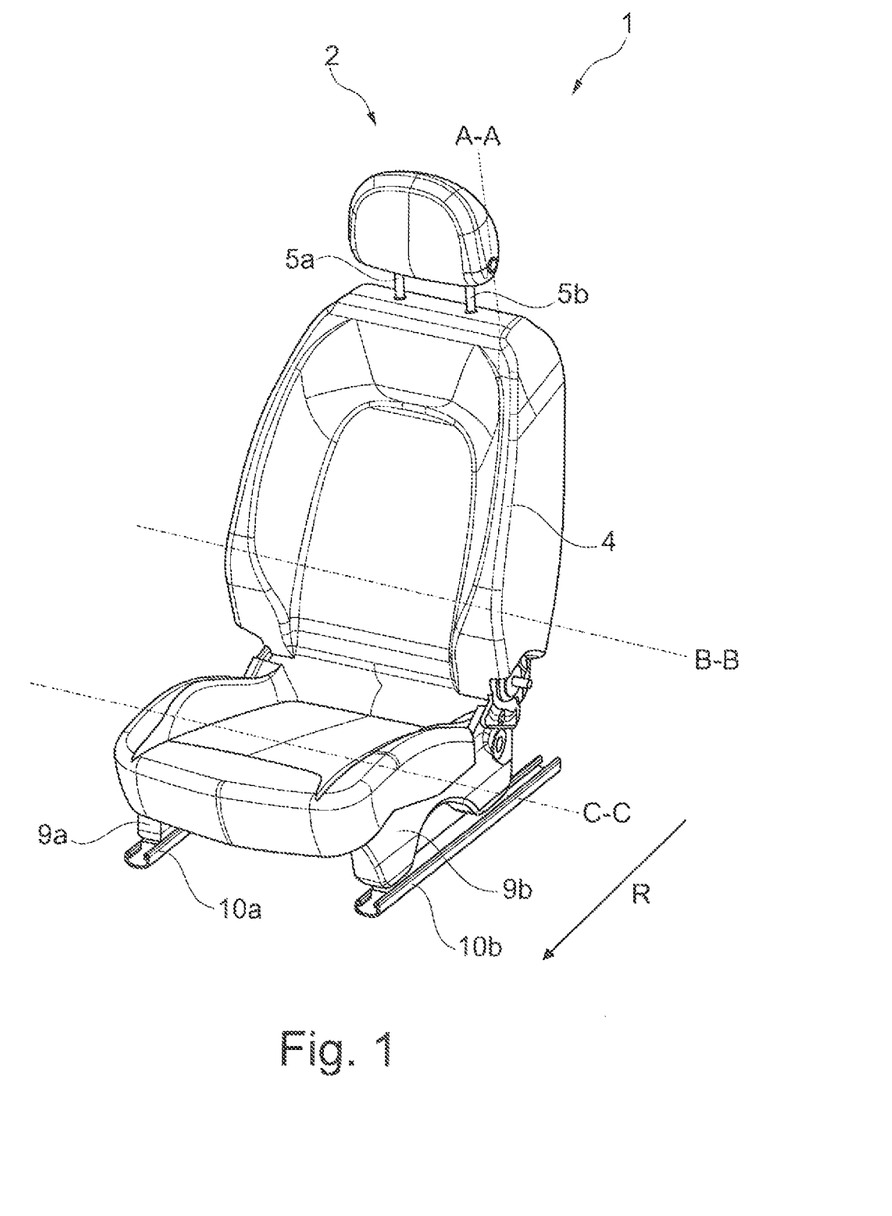
FIG. 1 a perspective top view onto a vehicle seat with a seat structure.

FIG. 1 shows a perspective top view onto a vehicle seat 1 for an automobile or truck. The vehicle seat 1 may be constructed as a driver's seat or passenger's seat or as a seat of a rear bench seat of the vehicle. The vehicle seat 1 is able to be installed in several different vehicles such as first and second vehicles. The first vehicle (nor shown) may be constructed as a first segment vehicle, e.g. as a B-segment vehicle or as a small car. Whereas, the second vehicle (not shown) may be constructed as a second segment vehicle, e.g. as a C-segment vehicle or as a medium-class car.

Figure 2:
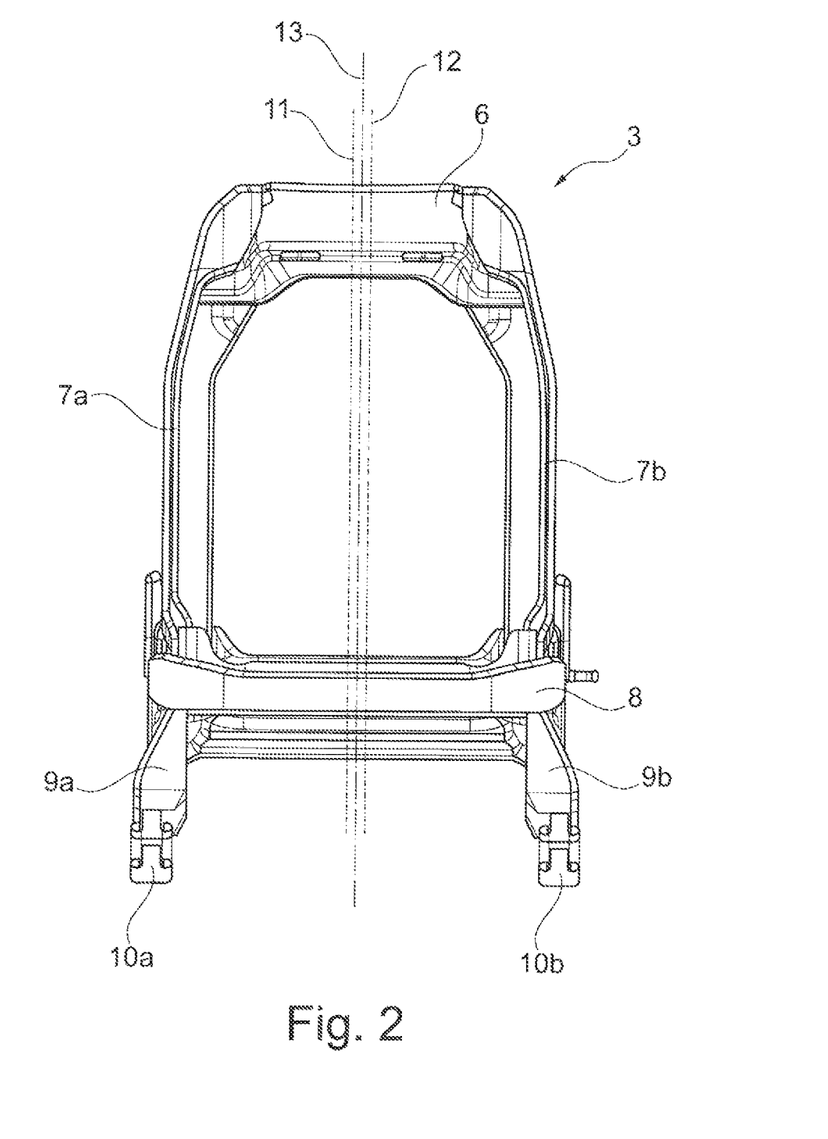
FIG. 2 a front view of the seat structure of FIG. 1 with definition of different seat tracks.

The vehicle seat has a headrest 2 and a seat structure 3 (FIG. 2). In FIG. 1 the seat structure 3 is covered by upholstery. The headrest 2 has a left headrest rod 5a in the image plane and directed contrary to the seat direction, and a right headrest rod 5b, via which it is connected with the seat structure 3.

The seat structure 3 shown in FIG. 2 has an upper transverse beam 6, in which the headrest rods 5a, 5b are fastened. The seat structure 3 also includes left and right side struts 7a, 7b on the seat back 4, a seat pan 8 and left and right side struts 9a, 9b on the seat pan 8 with which the vehicle seat 1 is connected with seat rails 10a, 10b, which are fastened to a floor of the vehicle.

In FIG. 2 a first seat track 11, a second seat track 12 and an averaged seat track 13 of the vehicle seat 1 are defined. The seat tracks 11, 12, 13 describe the center of the vehicle seat 1 in the vehicle. According to the first seat track 11, the vehicle seat 1 is installed or able to be installed in the first segment vehicle, and according to the second seat track 12 in the second segment vehicle. The averaged seat track 13 runs centrally between the first and second seat track 11, 12.

Figure 3:
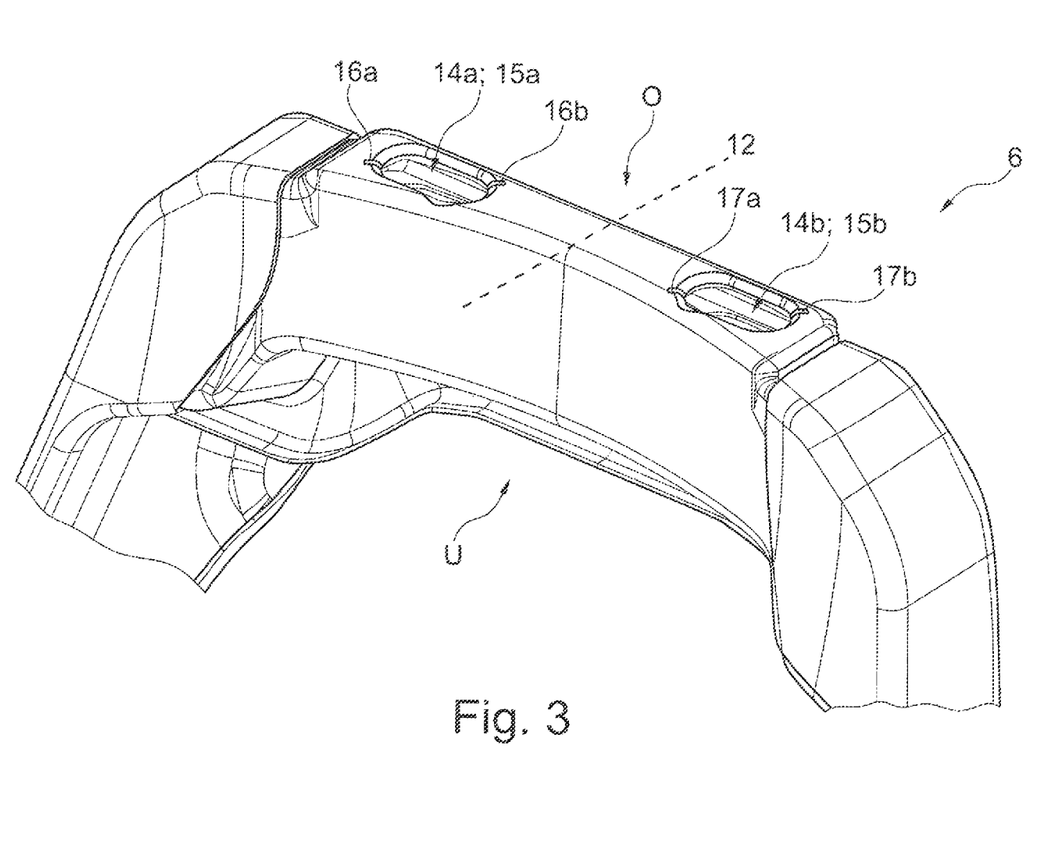
FIG. 3 an upper transverse strut of the seat structure of FIG. 2 in a perspective detail illustration.

FIG. 3 shows the upper transverse strut 6 of the seat structure 3 in a perspective detail illustration. The upper transverse strut 6 has a horizontally running upper side O and a horizontally running underside U. On the upper side O, a left receiving opening 14a of a left guide channel 15a for receiving the left headrest rod 5a and a right receiving opening 14b of a right guide channel 15a for receiving the right headrest rod 5b are arranged. The left and right receiving opening 14a, 14b are arranged mirror-symmetrically to the averaged seat track 13.

Figure 5:
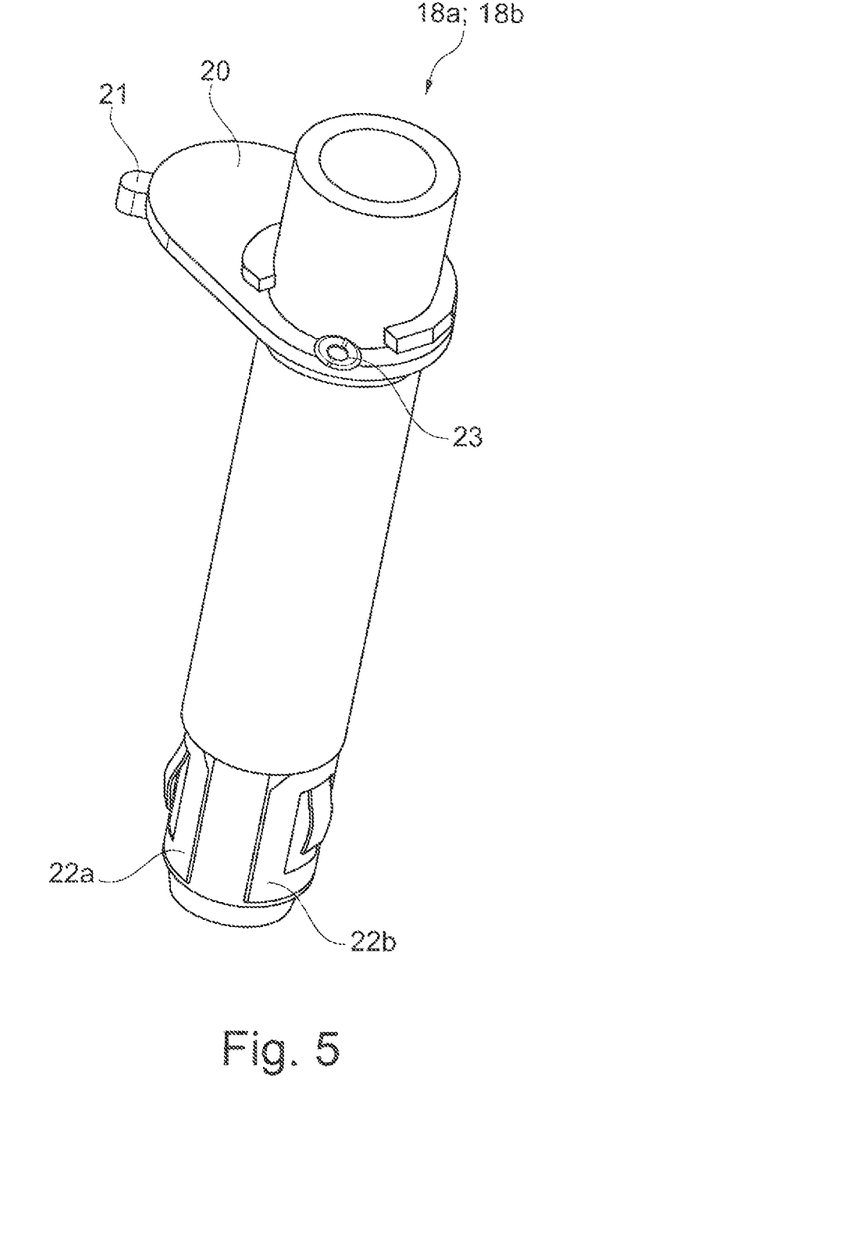
FIG. 5 a guide bush for two headrest rods of the headrest of FIG. 1.

The left receiving opening 14a has a left and right positioning cutout 16a, 16b for a first guide bush 18a (FIG. 5). The right receiving opening 14b has a left and right positioning cutout 17a, 17b for a second guide bush 18b (FIG. 5). The guide bushes 18a, 18b are able to be introduced into the guide channels 15a, 15b through the receiving openings 14a, 4b and are able to be inserted therein. The guide bushes 18a, 18b guide the headrest rods 5a, 5b (FIG. 1) in the guide channels 15a, 15b and fasten these to the upper transverse strut 6.

Figure 4:
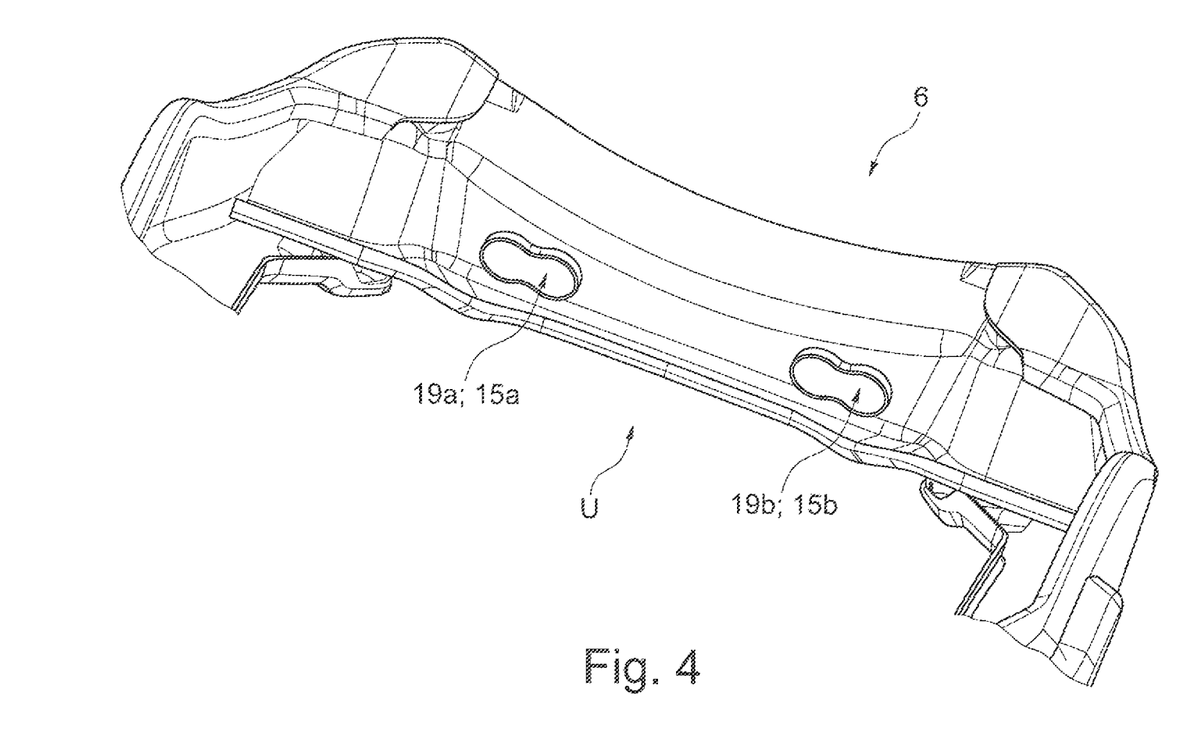
FIG. 4 a perspective top view from below onto the upper transverse strut of FIG. 3.

FIG. 4 shows the upper transverse strut 6 in a perspective detail illustration from below onto the underside U. There, a left locking device 19a is arranged for locking the first guide bush 18a and the left headrest rod 5a, and a right locking device 19b for locking the second guide bush 18b and the right headrest rod 5b. The two locking devices 19a, 19b are constructed as keyhole openings. The left guide channel 15a opens into the left locking device 19a, the right guide channel 15b into the right locking device 19b.

In FIG. 5 the first or respectively second guide bush 18a, 18b is illustrated. The first and second guide bush 18a, 18b are identical in construction. They are constructed as a tube into which the headrest rod 6a, 6b is able to be introduced. They have a diameter which guarantees a transition- or press fit with the guide channels 15a, 15b, when the guide bushes 18a, 18b are inserted into the latter. Each guide bush 18a, 18b has a radially outwardly projecting flange 20. When the guide bushes 18a, 18b are arranged in the guide channels 15a, 15b, the flange 20 covers the respective receiving opening 14a, 14b of the upper transverse strut 6.

The flange 20 has a positioning pin 21 for optional engagement into the left positioning cutouts 16a, 17a or into the right positioning cutouts 16b; 17b of the receiving openings 14a, 14b. In particular, through the positioning of the positioning pin 21 in the right positioning cutouts 16b; 17b, a first mounting position M1, and in the left positioning cutouts 16a, 17a a second mounting position M2 of the headrest 2 in the upper transverse strut 6 are realized. The positioning of the positioning pins 21 and the thereby selection of one of the mounting positions M1; M2 is able to be implemented by rotation of the guide bushes 18a, 18b about their longitudinal axis. Therefore, the headrest 2 is able to be displaced and/or adjusted in particular by rotation of the guide bushes 18a, 18b and by corresponding positioning of the flange 20 and of the positioning pin 21 transversely to the seat direction R.

A detent device 23 for locking in the respective receiving opening 14a, 14b is arranged on the flange 20. Each guide bush 18a, 18b has at least one, and preferably two or more, spring devices 22a, 22b. These are arranged at a lower end and radially circumferentially on the guide bush 18a, 18b. The spring devices 22a, 22b are constructed as leaf springs. They lock the guide bushes 18a, 18b and the headrest 2, arranged therein with the headrest rods 5a, 5b, in the respective locking devices 19a, 19b (FIG. 4), by bracing and/or locking into position.

Figure 6:
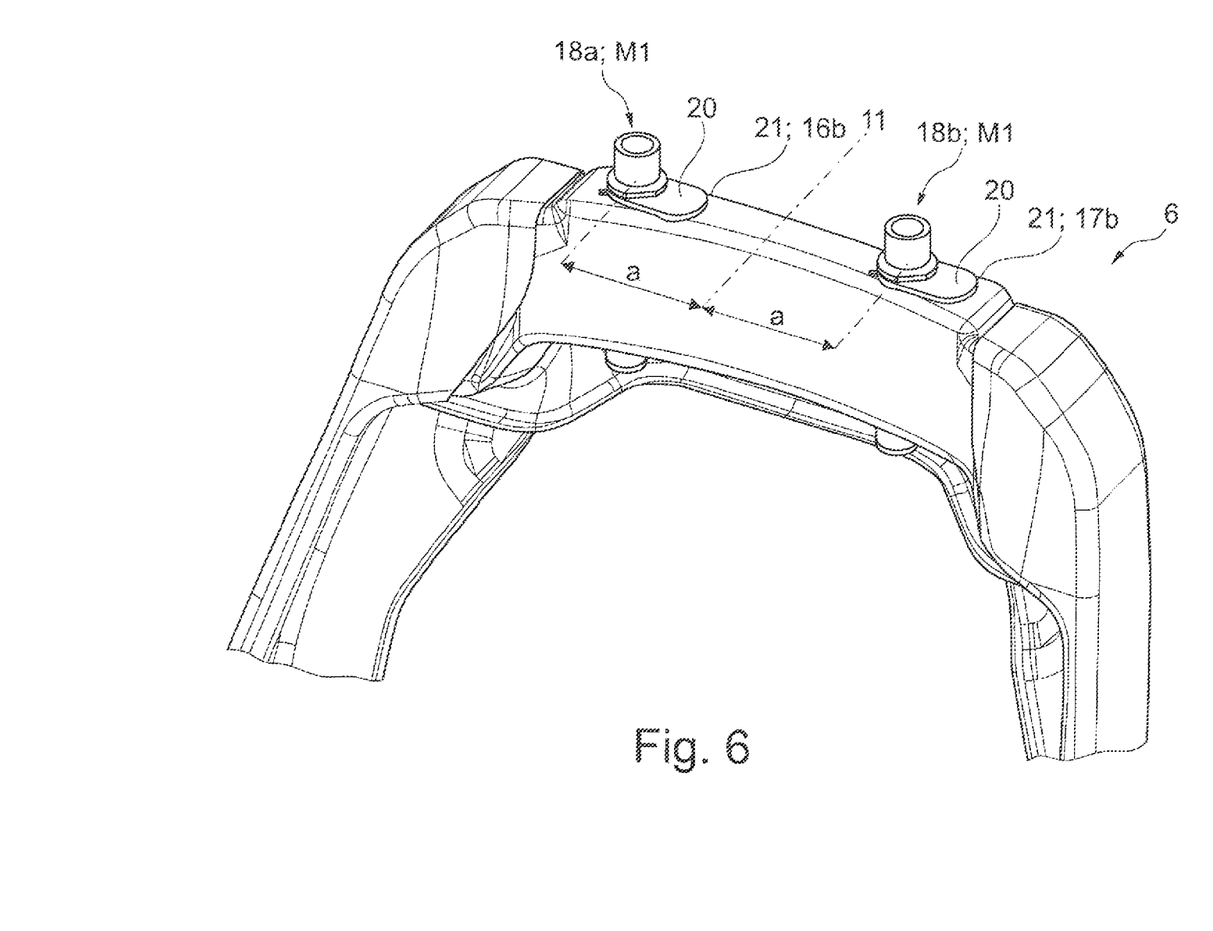
FIG. 6 the guide bushes mounted for a first mounting position of the headrest in the upper transverse strut.
Figure 7:
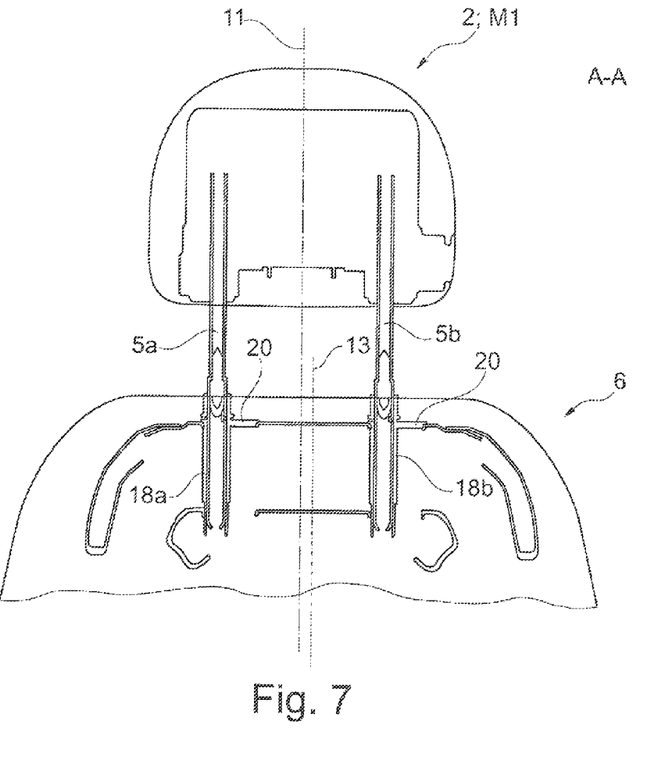
FIG. 7 the headrest mounted in the first mounting position in a sectional view.

The first mounting position M1 is shown in FIGS. 6 and 7. In particular, FIG. 6 shows the guide bushes 18a, 18b, positioned in the upper transverse strut 6 in the guide channels 15a, 15b, for mounting of the headrest 2 in the first mounting position M1. FIG. 7 shows the headrest 2 inserted into the guide bushes 18a, 18b and mounted in the first mounting position M1, in a sectional view A-A, the section line of which runs transversely to the seat direction R and through the guide channels 15a, 15b. The first mounting position M1 is selected when the vehicle seat 1 according to the first seat track 11 is installed in the first segment vehicle. In the first mounting position M1, the guide bushes 18a, 18b are arranged in the guide channels 15a, 15b so that their flanges 20 are directed towards the right. Thereby, the positioning pins 21 engage into the right positioning cutouts 16b; 17b. The guide bushes 18a, 18b and the headrest rods 5a, 5b inserted therein are arranged mirror-symmetrically to the first seat track 11.

Figure 8:
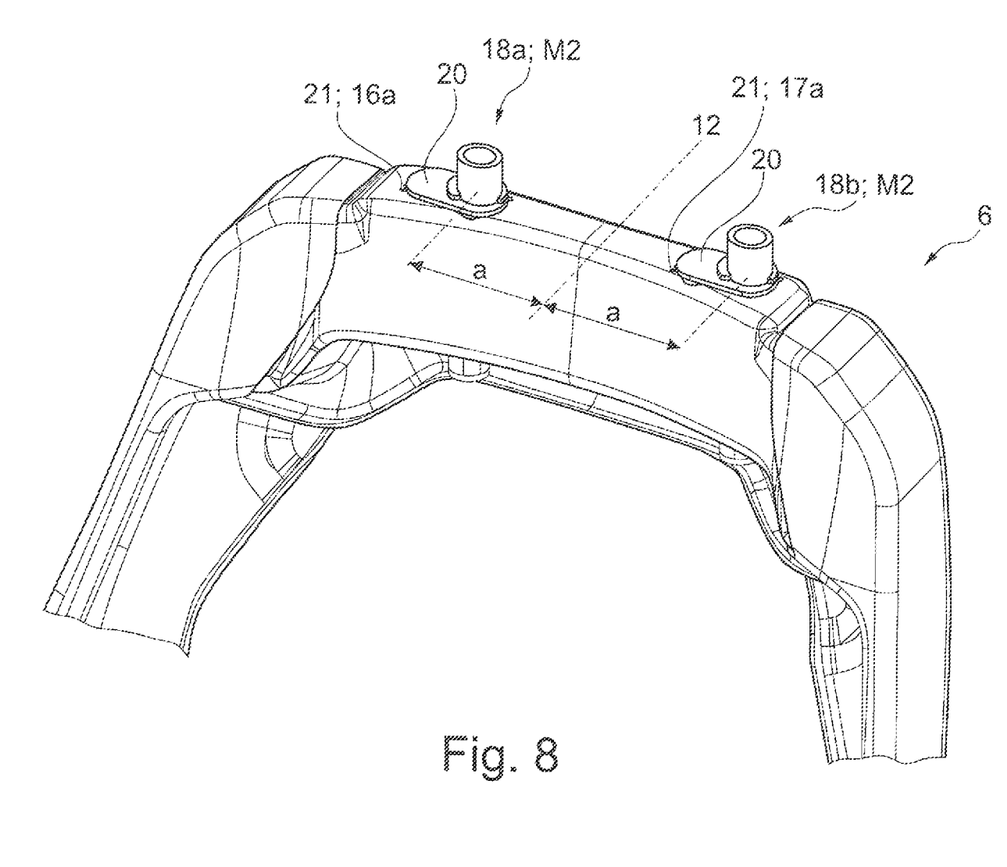
FIG. 8 the guide bushes mounted for a second mounting position of the headrest in the upper transverse strut.
Figure 9:
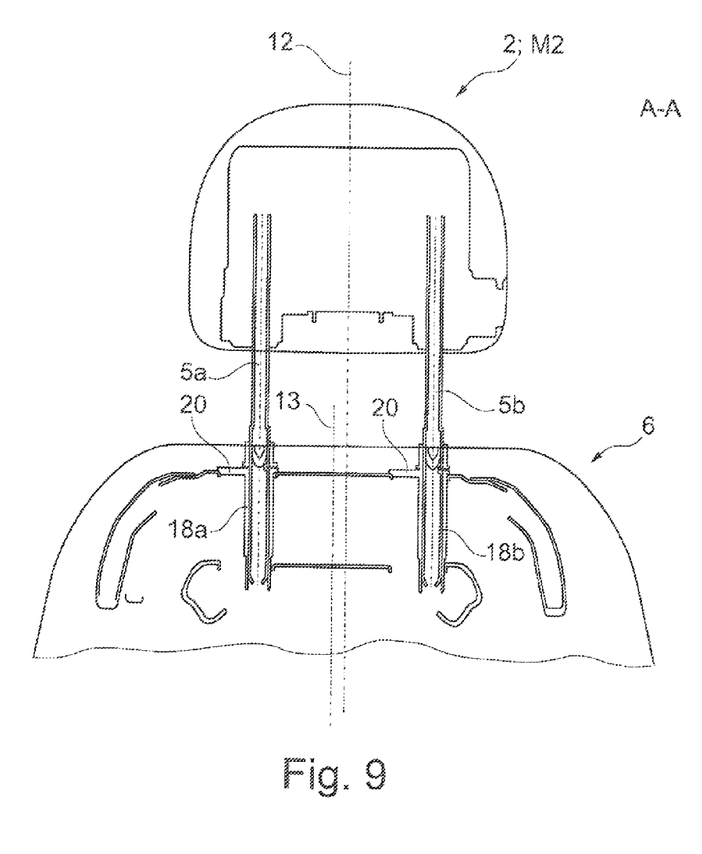
FIG. 9 the headrest mounted in the second mounting position in a sectional view.

The second mounting position M2 is shown in FIGS. 8 and 9. In particular, FIG. 8 shows the guide bushes 18a, 18b, positioned in the upper transverse strut 6 in the guide channels 15a, 15b, for mounting the headrest 2 in the second mounting position M2. FIG. 9 shows the headrest 2, inserted into the guide bushes 18a, 18h and mounted in the second mounting position M2, in the sectional view A-A, the section line of which runs transversely to the seat direction R and through the guide channels 15a, 15b. The second mounting position M2 is selected when the vehicle seat 1 is installed according to the second seat track 12 in the second segment vehicle, in the second mounting position M2, the guide bushes 18a, 18b are arranged in the guide channels 15a, 15b so that their flanges 20 are directed towards the left. Thereby, the positioning pins 21 engage into the left positioning cutouts 16a, 17a. The guide bushes 18a, 18b and the headrest rods 5a, 5b inserted therein are arranged mirror-symmetrically to the second seat track 12.

Figure 10:
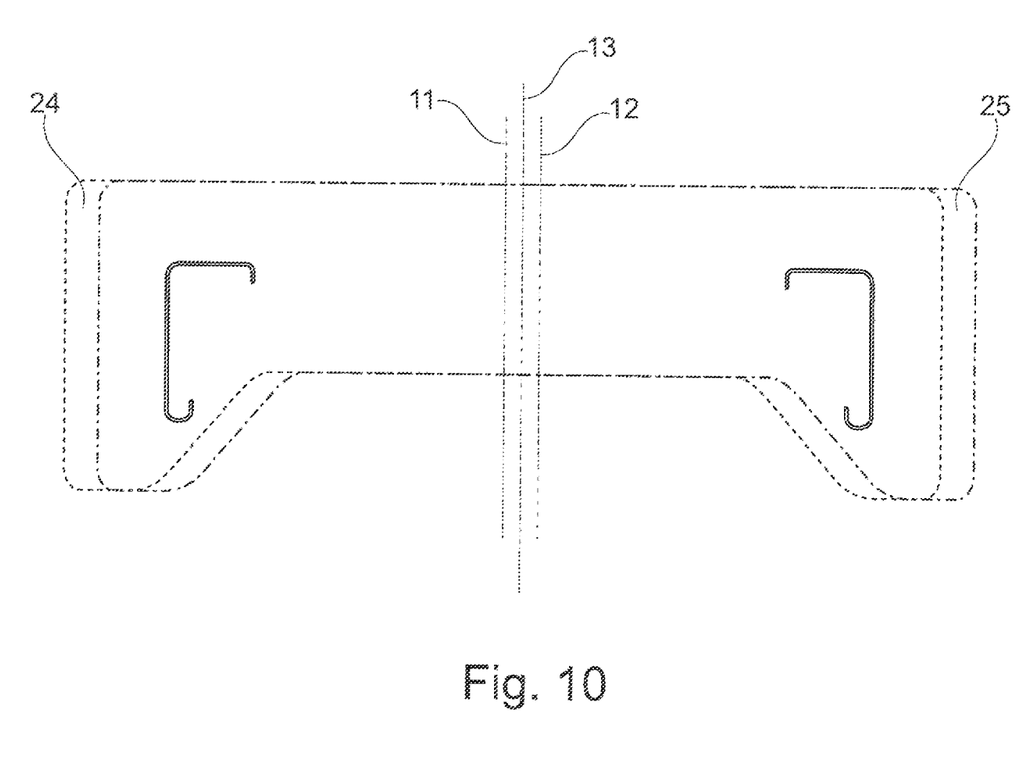
FIG. 10 a first and a second backrest seat upholstery in a sectional view.

FIG. 10 shows a first backrest seat upholstery 24 and a second backrest seat upholstery 25 for the backrest 28 of the vehicle seat 1 in a sectional view B-B, the section line of which runs transversely to the seat direction R. The first backrest seat upholstery 24 is constructed, in particular formed and/or foamed, mirror-symmetrically to the first seat track 111. It is arranged on the backrest 28 of the vehicle seat 1, when its headrest 2 takes up the first mounting position M1 and the vehicle seat 1 is, or respectively is to be, integrated according to the first seat track 11 in the first segment vehicle. The second backrest seat upholstery 25 is constructed, in particular formed and/or foamed, mirror-symmetrically to the second seat track 12. It is arranged on the backrest 28 of the vehicle seat 1, when its headrest 2 takes up the second mounting position M2 and the vehicle seat 1 is, or respectively is to be, integrated according to the second seat track 12 in the second segment vehicle.

Figure 11:
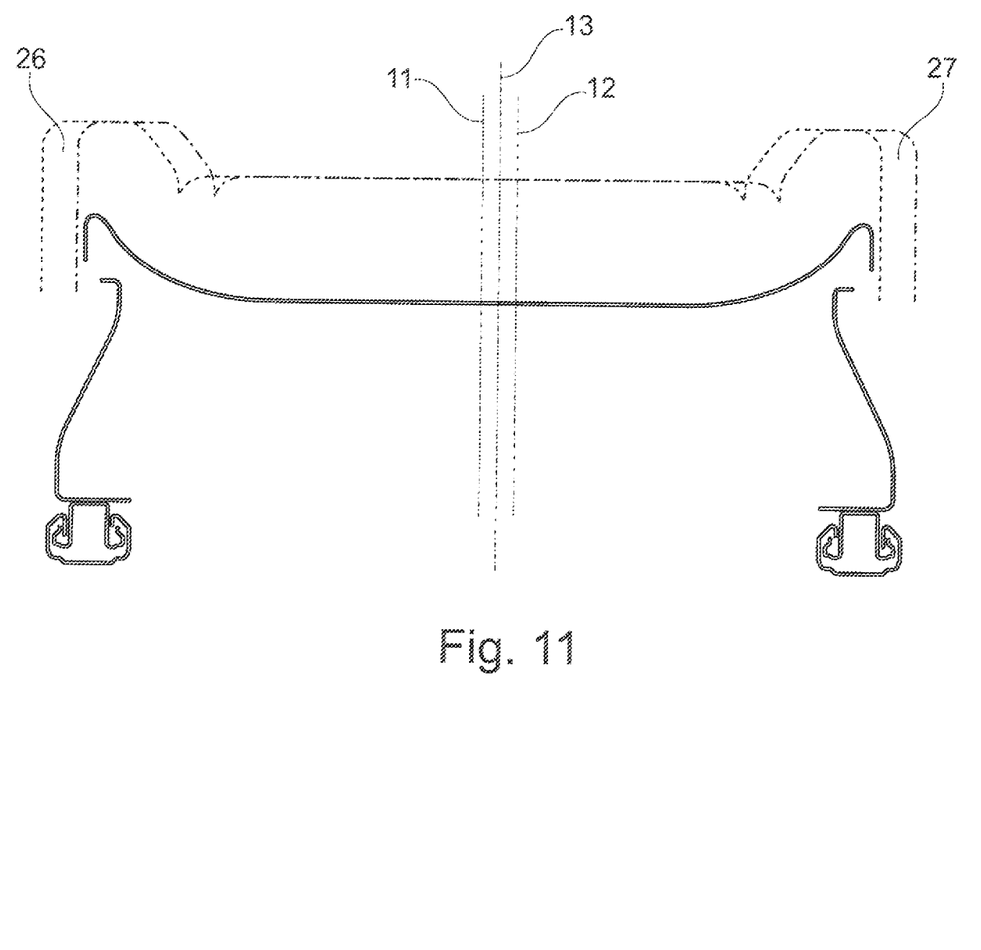
FIG. 11 a first and a second seat pan seat upholstery in a sectional view.

FIG. 11 shows a first seat pan seat upholstery 26 and a second seat pan seat upholstery 27 for the seat pan 8 of the vehicle seat 1 in a sectional view C-C, the section line of which runs transversely to the seat direction R. The first seat pan seat upholstery 26 is constructed, in particular formed and/or foamed, mirror-symmetrically to the first seat track 11. It is arranged onto the seat pan 8 of the vehicle seat 1 when its headrest 2 takes up the second mounting position M2 and the vehicle seat 1 is, or respectively is to be, integrated according to the second seat track 12 in the second segment vehicle. The second seat pan seat upholstery 27 is constructed, in particular formed and/or foamed, mirror-symmetrically to the second seat track 12. It is arranged onto the seat pan 8 of the vehicle seat 1 when its headrest 2 takes up the second mounting position M2 and the vehicle seat 1 is, or respectively is to be, integrated according to the second seat track 12 in the second segment vehicle.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A vehicle seat for a vehicle comprising:
    a seat frame including an upper transverse strut having a right opening for receiving a right guide channel in a first and second position and a left opening laterally spaced from the right opening for receiving a left guide channel in a first and second position; and
    a headrest having a right headrest rod arranged in the right guide channel and a left headrest rod spaced apart from the right headrest rod and received in the left guide channel, the headrest being configured to couple with the upper transverse strut in a first mounting position wherein the right headrest rod is received in the right guide channel in the first position and the left headrest rod is received in the left guide channel in the first position, and a second mounting position wherein the right headrest rod is received in the right guide channel in the second position and the left headrest rod is received in the left guide channel in the second position;
    wherein the headrest is offset transversely to a seat direction in the first mounting position with respect to the headrest in the second mounting position.

2. The vehicle seat according to claim 1, wherein the first mounting position is associated with a first seat track of the vehicle seat for a first segment vehicle, and wherein the second mounting position is associated with a second seat track of the vehicle seat for a second segment vehicle, wherein the second seat track is different from the first seat track.

3. The vehicle seat according to claim 2, wherein the fight and left opening are arranged mirror-symmetrically to an averaged seat track averaged from the first and second seat tracks.

4. The vehicle seat according to claim 1; wherein the upper transverse strut has a horizontal underside, the vehicle seat further comprising:
    a right locking device constructed on the horizontal underside for locking the right headrest rod in the upper transverse strut, wherein the right guide channel opens into the right locking device; and a left locking device on the horizontal underside for locking the left headrest rod in the upper transverse strut, wherein the left guide channel opens into the left locking device.

5. The vehicle seat according to claim 4 wherein the right and left locking devices are constructed as keyhole openings.

6. The vehicle seat according to claim 1, wherein the right and left opening are constructed as elongated holes on a horizontal upper side of the upper transverse strut, each of the elongated holes having a first cutout defining the first position and a second cutout defining the second position for receiving a guide bush for the right and left headrest rods.

7. The vehicle seat according to claim 6, wherein the upper transverse strut has a horizontal underside, the vehicle seat further comprising:
 a right locking device constructed on the horizontal underside for locking the right headrest rod in the upper transverse strut, wherein the right guide channel opens into the right locking device; and
 a left locking device on the horizontal underside for locking the left headrest rod in the upper transverse strut, wherein the left guide channel opens into the left locking device.

8. The vehicle seat according to claim 7, further comprising a pair of guide bushes including a right guide bush placed onto the right headrest rod to position the right headrest rod in the right opening, guide the right headrest rod in the right guide channel and fix the right headrest rod in the right locking device, and a left guide bush placed onto the left headrest rod to position the left headrest rod in the left receiving opening, guide the left headrest rod in the left guide channel and fix the left headrest rod in the left locking device.

9. The vehicle seat according to claim 8, wherein each of the pair of guide bushes comprise a radially projecting flange at an upper end for covering the opening of the upper transverse strut, the flange having a positioning pin configured to engage into the right or the left positioning cutout of the opening, wherein the headrest is mounted in the first mounting position when the positioning pin engages into the first positioning cutout and is mounted in the second mounting position when the positioning pin engages into the second positioning cutout.

10. The vehicle seat according to claim 8, wherein each of the pair of guide hushes comprise two radially circumferentially arranged spring devices arranged at a lower end for engagement and locking in the right and left locking device.

11. A vehicle fleet comprising:
 a first segment vehicle;
 a second segment vehicle; and
 a plurality of vehicle seats according to claim 1;
 wherein the first segment vehicle includes a first vehicle seat of the plurality of vehicle seats, the first vehicle seat having the headrest configured in the first mounting position; and
 wherein second segment vehicle includes a second vehicle seat of the plurality of vehicle seats, the second vehicle seat having the headrest configured in the second mounting position.

12. The vehicle fleet according to claim 11, wherein the right headrest rod of the first vehicle seat is arranged in the right guide channel and the left headrest rod is arranged in the left guide channel and at the same time are arranged mirror-symmetrically to a first seat track when the vehicle seat is arranged in the first segment vehicle.

13. The vehicle fleet according to claim 12, wherein a flange projects radially to the right from a guide bush and a positioning pin engages into a right positioning cutout of the right or respectively left opening, when the vehicle seat is arranged in the first segment vehicle.

14. The vehicle fleet according to one of claim 11, wherein the right headrest rod is arranged in the right guide channel and the left headrest rod is arranged in the left guide channel and at the same time are arranged mirror-symmetrically to a second seat track when the vehicle seat is arranged in the second segment vehicle.

15. The vehicle fleet according to claim 14, wherein a flange projects radially toward the left from the guide bush and the positioning pin engages into a left positioning cutout of the right or respectively left opening when the vehicle seat is arranged in the second segment vehicle.

16. The vehicle fleet according to claim 11, wherein the first vehicle seat includes at least one first seat upholstery configured mirror-symmetrically to the first seat track when the vehicle seat is arranged in the first segment vehicle.

17. The vehicle fleet according to claim 11, wherein the second vehicle seat includes at least one second seat upholstery configured mirror-symmetrically to a second seat track when the vehicle seat is arranged in the second segment vehicle.

* * * * *